United States Patent

Eastman

[15] 3,676,851

[45] July 11, 1972

[54] INFORMATION RETRIEVAL SYSTEM AND METHOD

[72] Inventor: Hal P. Eastman, Del Mar, Calif.

[73] Assignee: International Business Machines Corporation, Armonk, N.Y.

[22] Filed: March 31, 1970

[21] Appl. No.: 24,266

[52] U.S. Cl. ....................................... 340/172.5, 340/146.1

[51] Int. Cl. ....................................... G06f 11/00, G06f 71/28

[58] Field of Search ....................... 340/172.5, 146.1; 235/157

[56] References Cited

UNITED STATES PATENTS

| | | | |
|---|---|---|---|
| 3,332,069 | 7/1967 | Joseph et al. | 340/172.5 |
| 2,954,433 | 9/1960 | Lewis et al. | 340/146.1 |
| 3,291,972 | 12/1966 | Helm | 340/146.1 |
| 3,295,102 | 12/1966 | Neilson | 340/172.5 |
| 3,319,223 | 5/1967 | Helm | 340/146.1 |
| 3,408,631 | 10/1968 | Evans et al. | 340/172.5 |
| 3,411,135 | 11/1968 | Watts | 235/153 |
| 3,448,436 | 6/1969 | Machol | 340/172.5 |
| 3,456,243 | 7/1969 | Cass | 340/172.5 |
| 3,465,299 | 9/1969 | Schellenberg | 340/172.5 |
| 3,544,966 | 12/1970 | Harmon | 340/172.5 |

*Primary Examiner*—Paul J. Henon
*Assistant Examiner*—Mark Edward Nusbaum
*Attorney*—Hanifin and Jancin and John H. Holcombe

[57] ABSTRACT

Information retrieval employing a search argument which is compared to a specified part of each of the stored data records that are searched. The search is conducted sequentially in the specified part of the record until a decision of non-equality is made or the entire part searched and found equal. A small portion of the record spanning the point of non-equality is stored. The search is then continued, called a "second search," until another decision of non-equality is made or the remainder of the part searched and found equal. Error detection of the record is then made. The resultant error syndrome is checked to determine whether an error occurred and, if so, whether it occurred in the specified part at or before the point of decision. If either no error occurred or it occurred after the point of decision, the result of the first search is correct and no error correction is required for the search. If the error occurred at the point of decision, the error is corrected and the corrected portion compared to the corresponding portion of the search argument and the result analyzed together with the first and second searches to determine the results of the search. If the error occurred prior to the point of decision, the specified part of the record is again read and the correction made to the erroneous portion thereof and analyzed to determine the results of the search.

11 Claims, 5 Drawing Figures

INVENTOR

HAL P EASTMAN

BY [signature]

ATTORNEY

INFORMATION RETRIEVAL SYSTEM AND METHOD

BACKGROUND OF THE INVENTION

1. Field of the Invention

The invention relates to information retrieval employing the searching of data by comparison to a search argument and, more particularly, to the searching of data which may contain errors and the checking of errors related to the search.

2. Description of the Prior Art

The development of data processing systems has continually been directed toward the more efficient processing of larger amounts of data. The vast amounts of data involved has required the storing of this data on devices peripheral to the central computer. The stored data must therefore be located, retrieved, and transmitted to the central computer before it can be processed.

Keeping in the central computer the means to locate each individual data record in accordance with its physical address soon overtaxed the computer's memory capability. Hence, the use of keys to identify and find data records without knowing the location of the records has become widespread. A key is a non-order determining identification of each record. It may comprise such identifiers as randomly assigned employee numbers, their social security numbers, or may comprise outstanding insurance policy numbers wherein there are a plurality of cancelled policy numbers which do not appear in the file. There is no requirement of any particular order in arranging the records since all keys are searched until the desired record is found.

The search operation ideally is quite fast in that the key is read and at the same time compared to the desired key and a decision made. Thus, the keys can be scanned sequentially during a single pass of the records. There is ideally no need to recycle and go back to repeat a record.

In the more normal case, the data may occasionally contain errors. The prior systems would read the entire record, using the key portion for the search comparison, and supply the record to error detection circuitry. If any error is detected in the entire record, the prior system would stop the search operation and wait for a complete revolution of the storage device, usually a disk file. After the complete revolution, the complete record would be read into storage in the CPU.

Then, an error recovery procedure would be requested from another storage device and read into the CPU. Using the error recovery procedure, the CPU conducts the error correction of the entire record. The key of the corrected record is then compared in the CPU to the search argument. If the record is not the desired record, the search is resumed at the storage device.

In this manner, a considerable amount of time has been utilized for error detection and correction for the record, when in only a small percentage of instances does the error occur in the key. Further, even if the error occurred in the key, the chances are not high that it would affect the decision as to whether the record was that desired. Thus, the time utilized for the error correction most probably was wasted insofar as the search was concerned and thereby slowed the search operation considerably.

SUMMARY

It is therefore an object of the present invention to provide an information retrieval system and method in which only errors in data directly affecting the decision on a search are corrected.

Briefly, the invention comprises an information retrieval system and method for retrieving desired records from a data storage means by searching a plurality of sequentially appearing records until the desired record is found. Each record includes redundant error check data iteratively developed from the record. The search operation comprises comparing a predetermined part of each of the records with a search argument. The comparison of a record is conducted sequentially until a decision of non-equality is made or the entire part searched and found equal. The portion of the record immediately spanning the point of non-equality is stored in memory. A second search is then conducted as a continuation of the first search until another decision of non-equality is made or the remainder of the part is searched and found equal. Error detection of the record is made including the redundant error check data to iteratively develop error check information. The error check information is analyzed to determine whether an error occurred in or before the stored portion of the record including the point of decision. If not, the result of the first search is selected as being correct. If the error occurred in the stored portion, the stored portion of the record is corrected and the corrected portion compared to the corresponding portion of the search argument to determine whether the decision of non-equality was correct, causing selection of the result of the corrected first search as being correct, or whether the comparison was now equal, causing selection of the result of the second search. If the error occurred prior to the stored portion of the record, the specified part of the record is then again searched and the correction made to the erroneous portion thereof.

DESCRIPTION OF THE PREFERRED EMBODIMENT

Figure 1:
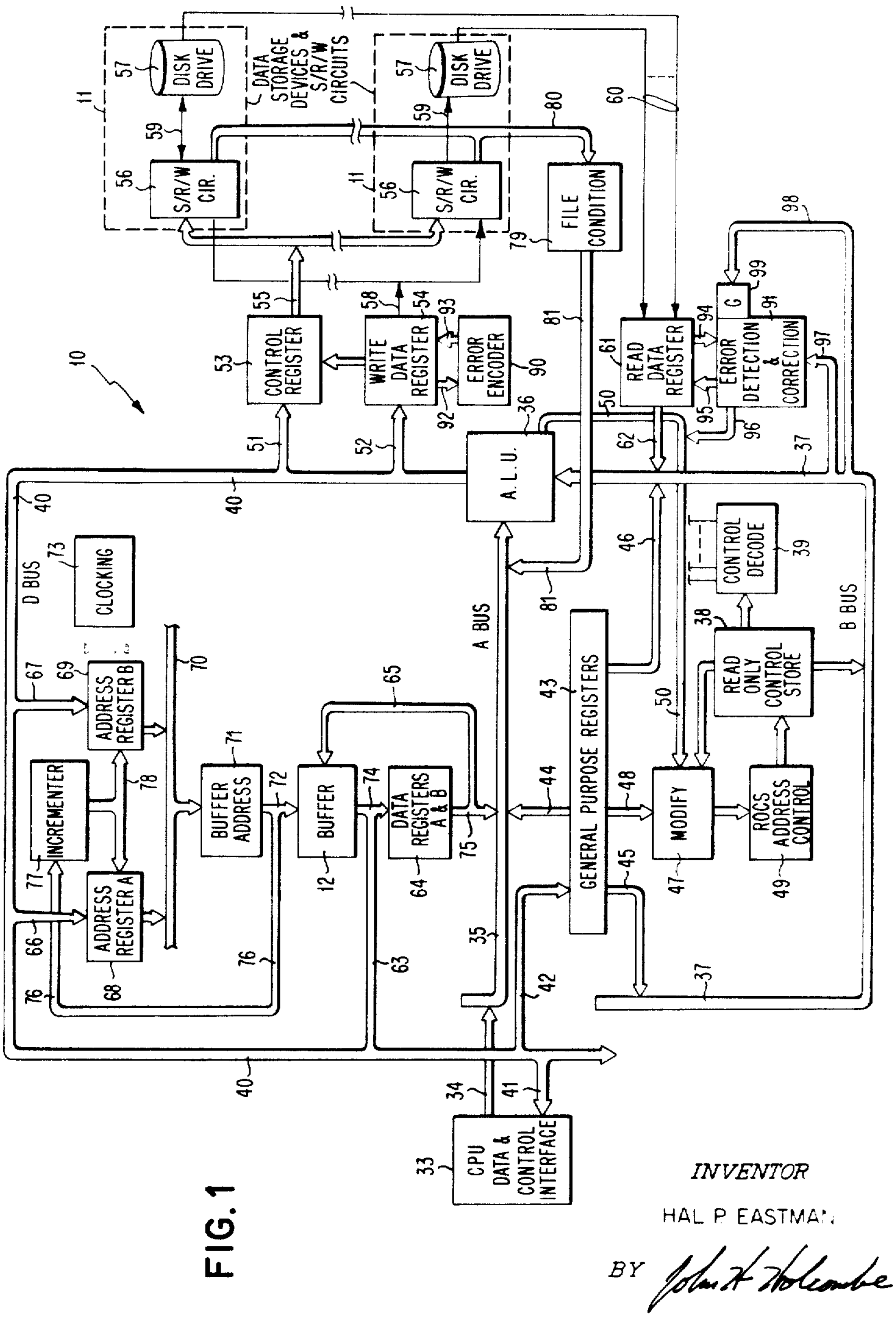
FIG. 1 is a diagrammatic representation of a data storage and retrieval system employing the present invention therein.

Referring to FIG. 1, a data storage and retrieval system 10 constructed in accordance with the present invention is illustrated. This system, with the exception of certain circuitry which will be specified hereinafter, is the same as that described in issued U.S. Pat. No. 3,544,966 filed Dec. 27, 1966, "Method and Apparatus for Multiplex Control of a Plurality of Peripheral Devices for Transfer of Data with a Central Processing System," John J. Harmon, assigned in common with the present application. For a detailed description of the specific portions of the data storage and retrieval system 10, 11 not essential to the present invention, reference is made to the above-identified, U.S. Patent, which is hereby incorporated by reference.

The storage control unit 10 is employed in data processing systems for controlling the operation of a plurality of data storage devices 11 to provide the transfer of data between the devices and a central processing unit. The primary functions of the storage control unit are to operate in response to instructions received from a central processing unit to operate the devices to find desired data or empty space in which to place data, and to then transfer data between the central processing unit and the desired location of the data storage device.

The illustrated storage control unit 10 includes a buffer 12 comprising a core memory. This type of storage means is not essential to the invention, although some storage is employed thereby. That storage may comprise a series of registers or any equivalent well-known type of storage. The primary function of the buffer 12 is not directly related to the present invention and allows a separation of the transfer of data between the control unit and data storage device and between the control unit and central processing unit, rather than the direct transfer between the central processing unit and the data storage device as required by other storage controls. The following individual elements in the storage control 10 per se are old and well-known to those skilled in the art, forming the environment for the present invention.

A CPU data and control interface 33 comprises circuitry which communicates directly between the CPU and the storage control circuitry. In most instances, the interface 33 communicates with a portion of the CPU called a "channel." The channel comprises apparatus for interfacing between the core memory of a CPU and a plurality of storage controls. Data and information from the CPU data and control interface is transmitted on a set of parallel wires making up a cable 34 to the "A" bus 35. The A bus 35 comprises a set of parallel wires connected to an arithmetic logic unit 36. The second input to arithmetic logic unit 36 comprises a set of wires called "B" bus 37.

The arithmetic logic unit 36 comprises a set of logic and gating circuits which are operated under the control of read-only control storage 38 and control decode circuitry 39 to perform various functions. Some of the functions are those of transmitting data from A bus 35 or from B bus 37 directly onto a "D" bus 40, and of comparing data appearing on A bus 35 with data appearing on B bus 37 to indicate whether the data on B bus 37 is equal to, higher than, or lower than the data on A bus 35. Data appearing on D bus 40 is transmitted on parallel lines making up cable 41 to CPU data and control interface 33 and on cable 42 to a set of general purpose registers 43. General purpose registers 43 comprise various registers, each of which is capable of storing bits of parallel data presented from D bus 40. The transfer of data from D bus 40 to any one of the registers on cable 42, and the transfer of data from any one of the registers to B bus 37 on cables 45 or 46, to modifying circuitry 47 on cable 48, or to A bus 35 on cable 44 are controlled by gating signals. The gating signals comprise pulses appearing on outputs from control decode circuitry 39. Data gated from D bus 40 into a specific register is held, unchanged, in the register until new data is entered, and the data may be gated out at any time upon cables 44, 45, 46 or 48.

Read-only control store 38 comprises a plurality of permanent read-only storage units. Each unit comprises a single input line and a plurality of individual output lines. An address supplied to address control circuitry 49 is decoded thereby to select one of the read-only storage units. This selection comprises establishment of an input pulse upon the single input to the read-only storage unit. By virtue of its configuration, the selected read-only storage unit then provides output pulses on selected ones of a plurality of lines from the read-only control module 38. These pulses operate logic decoding circuits and control decode circuitry 39. This decoding provides signals on various lines which control various operations in the arithmetic logic unit 36, control the gating to and from the general purpose registers 43, control the gating of data to and from CPU data and control interface 33 and control the operation of various circuits to be detailed hereinafter.

The read-only storage unit also provides outputs to modifying circuitry 47, which outputs comprise the primary addressing data for addressing the next read-only storage unit. This circuitry may modify the primary address data with data on cable 48 from a general purpose register 43, or on cable 50 from ALU 36, to alter the code thereof to cause address control register 49 to select a read-only storage unit different from that which would have been selected without such modification.

Data from D bus 40 may be transmitted over lines 51 and 52 to a control register 53 and a data register 54. The transmission of data to control register 53 or input data register 54 is accomplished by operation of gating circuits which are controlled by lines from control decode circuitry 39. Control register 53 comprises suitable decoding logic and storage registers for decoding and storing data supplied it from D bus 40. The outputs of the control register control and direct the operation of a plurality of data storage devices 11. The data storage devices may comprise disk files having seek/read/write control circuitry 56 and disk drive assemblies 57.

Data is supplied on parallel cable 52 to input data register 54 which converts the data from parallel to serial form and directs the serial output over line 58 to the disk files. Control register 53 controls the disk files to cause the proper disk file to write the data from data register 54 thereon over the selected line 59.

Likewise, control register 53 may operate a desired disk file to read data therefrom and transmit such data over the proper line 60 to output data register 61. This register converts the serial data to parallel form and, when gated under the control of one of the lines from control decode circuitry 39, transmits the data in parallel on cable 62 to B bus 37.

Input data register 54 and output data register 61 in fact utilize the same register but with different logic and gating to respectively serialize or deserialize data.

A magnetic core storage array, called buffer 12, is provided together with associated read, write, addressing and clocking circuitry. Specifically, data to be written in the buffer 12 is transmitted from D bus 40 on cable 63 to data registers 64. Data registers 64 comprise two registers in parallel together with switching circuitry to gate data from D bus 40 first to register A then to register B. Each register holds a plurality of bits called a "byte." When both registers are filled with data, or if only one register is to be filled, the data is simultaneously transmitted on cable 65 from both registers to the buffer 12.

The address in the core storage unit 12 into which the data is inserted is controlled by the address data transmitted from D bus 40 over cables 66 or 67 to address register 68 or address register 69. The choice of which address register to use is controlled by read-only control storage 38 and is not important here. The address specifies the bit position in the core storage unit for the first bit of two bytes of data transmitted in parallel from both data registers 64.

The buffer address is transmitted from address register 68 or address register 69 over cable 70 to buffer address register 71. This register stores the proper core address and contains control circuitry to drive, via cable 72, the cores at the designated address and associated bytes. The data transmitted on cable 65 is thereby inserted by conventional core driving techniques into the addressed bytes of core.

To read data from the memory, the address of the desired data in the core buffer 12 is transmitted from D bus 40 over cables 66 or 67 to address register 68 or 69 in the same manner as the write operation. This address is then transmitted over cable 61 to buffer address register 62 which drives, over cable 72, the addressed two bytes of cores. The two bytes of data in the addressed cores are transmitted in parallel on cable 74 to data registers A and B comprising data register 64. The switching circuitry of the data register 64 then operates to gate the data first from register A, then from register B, over cable 75 to A bus 35.

Where data more than two bytes in length is to be stored in or read from the core buffer 12, it is desirable to avoid the necessity of transmitting the address of each subsequent two bytes of data. Hence, the address of each two bytes of data which is inserted in or read from the core buffer is transmitted on cable 76 to incrementing circuit 77. This circuit adds a constant to the address of the prior data to form a new address two bytes higher than that of the previous address, and transmits the new address on cable 78 to address registers 48 and 69. The gating circuitry at the address registers gates the new address to the register 68 or 69 which handled the previous address. The incrementing circuit thus continues operation through the end of the sequence of data presented from D bus 40 or read onto A bus 35.

The timing of the various operations of the described circuitry is controlled by timing apparatus 73 in accordance with conventional techniques.

File condition circuit 79 comprises OR circuits interconnecting the cable 80 from the individual files, logic decoding circuitry and two registers, one for storing ORed data and the other for storing decoded data. Each data storage device 11 establishes a voltage level on one line of cable 80 when the file has completed a seek operation. A seek operation refers to a data storage device having a transducer which is shared between a plurality of tracks, and the seek operation comprises the movement of a transducer to a desired track. The voltage levels are ORed together in the file condition circuitry 79 to a register. The register supplies an output on one line of cable 81 when gated therefrom. This signal indicates that at least one of the data storage devices 11 has completed a seek operation.

The address of the selected track, including the device address, is also transmitted on cable 80 to file condition circuitry 79 when a seek has been completed. The track address is decoded by a logic circuit which sets a bit in a position of the second register therein indicating which device has completed a seek.

In addition, the read-only control storage 38 may operate to transmit a test command on the B bus 37 and operate control decode circuitry 39 to gate the command to control register 53, which command selects the designated device 11, causing it to transmit a code word on cable 80. This code word will designate the device sending the code word and the present status of that device. This code word is accepted by file condition circuitry 79, stored therein and, upon gating thereof, transmits the word on cable 81 to A bus 35.

The above-described apparatus has been commercially available as the IBM 2314 Direct Access Storage Facility, without the buffer 12, and as the IBM 2314 DASF-Airlines Buffer System with the buffer. These machines are considered well-known to those skilled in the art and form merely the environment for the present invention.

The major circuitry addition to the above-described apparatus comprises error encoder 90 associated with write data register 54, and error detection and correction circuitry 91 associated with read data register 61. The circuitry 90 and 91 may take several forms, the sole requirement being that, as a result of the encoding by circuitry 90, error detection and correction circuitry 91 supplies an indication of the location of an error or set of errors in a record, and supplies data to allow correction of errors. Various examples of such apparatus is available in the patent art. For example, apparatus fulfilling the requirements of circuitry 90 and 91 is described in my issued U.S. Pat. No. 3,622,984 filed Nov. 5, 1969, and entitled "Error Correction System and Method, which is hereby incorporated by reference. Another example comprises the copending patent application of I. B. Oldham, Ser. No. 798,976, filed Feb. 13, 1969, and entitled "Error Detection and Correction System with Data Recovery."

The apparatus 90 and 91 described in my copending application may operate entirely on parallel data. Therefore, incoming data on parallel cable 52 which is gated to write data register 54 is immediately transmitted thereby on cable 92 to error encoder 90. As the error encoding is accomplished, the data is transmitted on cable 93 to the write data register 54 for conversion to serial form and subsequent transmission on line 58. Similarly, the serial data from a selected data storage device 11 appearing on the corresponding line 60 to read data register 61 is converted from serial to parallel form and supplied on cable 94 to error detection and correction circuitry 91. As the circuitry operates, the data is supplied on cable 95 to the read data register 61, which immediately gates the data on cable 62 and cable 37 to the ALU 36. The error detection and correction circuitry includes an additional output 96 which supplies an indication to cable 50 and to modifying circuitry 47 that the data is correct or that an error has been detected. In addition, a cable 97 is connected from B bus 37 to the error detection and correction circuitry 91. When gated thereby, data supplied on B bus 37 and cable 97 is corrected by error detection and correction circuitry 91 then supplied on cable 95 to read data register 61, and subsequently supplied on cable 62 to B bus 37.

Another cable 98 is connected to error detection and correction circuitry 91 in conjunction with cable 94 by means of gating circuitry 99. Thus, data on cable 94 is normally supplied to the error detection and correction circuitry blocking the data on cable 98. But, when control decode 39 operates the gates 99, the data on cable 94 is blocked and the data on cable 98 is gated to the error detection and correction circuitry.

The other addition to the above-described apparatus comprises the addition of instructions to read-only control store 38 in accordance with the following description.

The operation of the apparatus of FIG. 1 leading to operation of the subject information retrieval system in accordance with the subject method will now be described.

The CPU may supply an instruction to CPU data and control interface 33. Included in this instruction is an address designating the storage control 10 and designating the selected storage device 11 connected to the storage control, and a code word indicating that the CPU wishes to issue a set of instructions thereto. The CPU data and control interface 33 indicates to the CPU that the storage control has been selected and transmits a device address and code word over cable 34 to A bus 35. The data is transmitted by A bus 35 to ALU 36. The read-only storage unit 38 causes ALU 36 to transmit the data, unchanged, via D bus 40 and cable 42, into a general purpose register 43.

The code word is sent over cable 48, modifying in circuit 47 the address of the following read-only storage unit received from read-only control storage module 38. The modified address is decoded by address control circuitry 49 to select a read-only storage unit. Pulses from the read-only storage unit are decoded by control decode circuitry 39 which operates to gate out the contents of a register 43 in which each bit position represents a storage device 11. For each bit position, a "1" indicates that an instruction is outstanding for the corresponding device, and a "0" indicates that the device is available.

This data is decoded by the read-only storage unit and a "-busy" or "available" code is transmitted via B 37, ALU 36, D bus 40 and cable 41 to the CPU data and control interface 33. This code indicates whether the device is available or unavailable, thereby accepting or rejecting the command.

Assuming that the device is available, the CPU transmits the instruction set and accompanying data, if any, over cable 34 in parallel groups of binary data. A single group of this binary data is called a "word" or a "byte." Each byte is transmitted in parallel via A bus 35, ALU 36, D bus 40 and cable 63 to data register 64.

The address of the first bit position for the instruction set in the buffer 12 is set in address register 68 or 69. When two bytes of data have been set in data register 64, they are transmitted in parallel on cable 65. At the same time, the core address is transmitted on cable 70 to buffer address register 71. The buffer address register operates to drive the address cores of buffer 12 to set therein the data from cable 65.

The address is also transmitted on cable 76 to incrementing circuit 77 which adds a constant to the received address. The resultant new address is inserted in the address register 68 or 69 which contained the previous address. When the next two bytes of data have been received, the incremented address is transmitted to buffer register 71 to cause the two bytes of data to be set into buffer 12.

The process then continues until all of the instruction set and data have been properly inserted in the instruction set area of the buffer and the data area of the buffer, respectively, set aside for the designated data storage device 11. The data area may thus include data supplied from the channel comprising a desired "key." A "key" comprises a non-order determining identification of each record.

At the conclusion of writing the information into buffers, the read-only control store 38 transmits a code word via B bus 37, ALU 36, D bus 40 and cable 41 to the CPU to indicate that the information has been properly received and stored. The read-only storage unit also causes a bit to be inserted in the bit position of a register 43 to designate that the device is busy.

The next addressed read-only control storage unit causes a portion of the stored instruction set to be read out of core and compared in ALU 36 to a code word set into the ALU from B bus 37 by the read-only storage unit. A positive comparison indicates that a seek instruction is included in the instruction set. The ALU 36 supplies signals on cable 50 to modifying circuit 47 to indicate that the comparison was made. The modifying circuitry therefore causes the next read-only storage unit to be addressed by control circuitry 49. The next read-only storage unit then causes the seek address (the desired track, as described above, of the selected data storage device 11) to be read out of the instruction set in buffer 12. The seek address is transmitted on cable 51 to the control register 53 and the circuitry thereof operated to issue the seek address to the seek apparatus 56 of the selected data storage device 11.

When the access mechanism of the selected data storage device 11 has reached the desired track, and the transducer switched on, the seek circuitry 56 thereof immediately sets a voltage level on one line of cable 80. This voltage level indicates that at least one device has a seek complete. In addition, the seek circuitry 56 transmits the address of the track, including the device address, on cable 80 to file condition circuitry 79. This circuitry responds by setting a bit in the bit position of a register therein corresponding to that device. This bit designates the device queuing the seek complete.

In a manner not discussed here, the storage control 10 may perform other tasks, or the same tasks for other of the data storage devices, during the time required for the seek to be completed. Thus, a number of seeks may stand completed at any one time. Those voltage levels would then be ORed together in file condition circuitry 79, and the bit position in the register for each device having a seek complete would be filled.

To test for a seek complete, the voltage level from the OR circuit in file condition circuitry 79 is gated out on cable 81 to A bus 35 and ALU 36. The voltage level is detected thereby, indicating that at least one device has completed a seek.

The ALU 36 indicates the detection by providing signals on cable 50 to modifying circuitry 47. Hence, a read-only storage unit is activated which causes file condition circuitry 79 to gate out the contents of the queue register therein onto cable 81. The ALU 36 selects the bit in a bit position standing highest in a predetermined order transmitting the designation of the selected device to a general purpose register 43. Subsequent read-only storage units cause the device designation to be read out of the selected register 53 and positioned in a selected spot of buffer 12. Another read-only storage unit causes the device designation to be read out of buffer 12 (all read-outs are non-destructive) and causes the head selection to be read out of the instruction set for the designated device and supplies the device and head designations sequentially to control register 53 together with a search command from the instruction set.

The control register circuitry responds by selecting the desired transducer from the selected device to transmit the data as detected thereby onto the associated line 60 to read data register 61. This data is converted to parallel form in read data register 61 and supplied on cable 62 and B bus 37 to ALU 36. There it is compared with a special character temporarily withdrawn from buffer 12 and stored in a general purpose register 43. This character designates the beginning of a record. When the ALU 36 indicates a comparison on lines 50, the next read-only storage unit causes error detection and correction circuitry 91 to begin error detection of the record. In addition, another special character is set into the general purpose register for comparison in the ALU. This character designates the beginning of a key. Hence, the data, as transmitted by error detection circuitry 91 on cable 95, is supplied on cable 62 and B bus 37 to the ALU 36 for comparison thereat to the special character.

Figure 2:
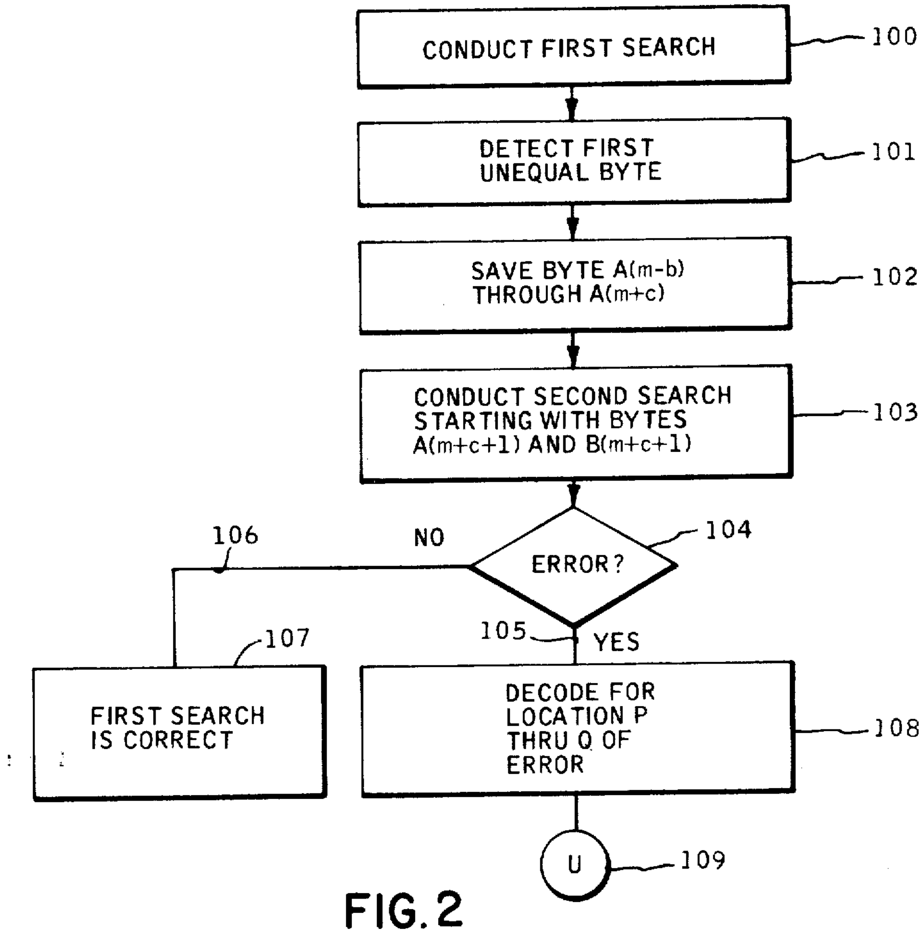
FIGS. 2 through 5 are flow chart diagrams of the operation of the present invention.

A comparison therebetween indicates that the data following the detected character comprises the key for that record. Upon detection of the special character by ALU 36, the signal supplied thereby on line 50 causes another read-only storage unit to be selected. Referring additionally to FIG. 2, this selection initiates step 100, called Conduct First Search. As directed by control decode circuitry 39, a stream of data comprising the desired key is supplied from data area for the desired device of buffer 12 on A bus 35 to ALU 36. At the same time, the data from the device comprising the key of the record being read is supplied on line 60 to read data register 61, converted to parallel form, operated on by error detection circuitry 91, and transmitted on cable 62 and B bus 37 to the ALU 36.

The ALU 36 thus sequentially compares the desired key data on A bus 35 from the buffer to the key data being read from the device. The ALU indicates each equal comparison by signals on lines 50, resulting in a continuance of the search in that no change is made to the read-only storage unit which has been selected. In addition, the data from the device is transmitted by ALU 36 on D bus 40 and stored in buffer 12. A maximum of five bytes of data are so stored in the buffer. The first five bytes of the key data are stored sequentially in the allotted space in the buffer. The sixth byte transmitted from the ALU is supplied to the same address as the previously stored first byte, thereby displacing that first byte. Thus, the incoming key data from the device continually overlays the prior data so that a current string of five bytes of data is stored. Each operation of the ALU in conducting the comparison causes the addition thereby of a count to a running total stored in a general purpose register 43. This total indicates the position in the record of the byte being compared.

The function of ALU 36 in comparing the data on A bus 35 with the data on B bus 37 is to detect the first inequality in the strings of data. This detection comprises step 101 of FIG. 2. Upon detection of such an inequality, the ALU supplies an output on lines 50 to the read only control store which causes selection of another read-only control storage unit. It directly supplies an output indicating the result of the search on B bus 37 for transmission by ALU 36 over D bus 40 and cable 42 to a general purpose register 43. This read-only storage unit also discontinues the count of data bytes so that that general purpose register 43 indicates the location "$m$" of the first unequal byte. Then it causes the two subsequent bytes of data received on B bus 37 from read data register 61 to be gated, via D bus 40, to the buffer 12 to continue to overlay the previously stored data. This comprises step 102 and results in saving the byte "$A(m)$" having the inequality, the two bytes "$A(m-b)$" and "$A(m-b+1)$" immediately preceding the byte having the inequality, and the two bytes "$A(m+c-1)$" and "$A(m+c)$" immediately following the bytes having the inequality.

Upon storage of these bytes, the read only control store causes the desired key data from buffer 12 to continue to be supplied on A bus 35 and the key data from the data storage device to continue to be supplied to error detection and correction circuitry 91 and to B bus 37 to ALU 36. The ALU 36 continues a comparison of the data in order to detect an inequality. This comprises step 103, and is called the second search. The second search continues until another unequal byte is located, or the entire key is compared and found equal. As with respect to the first search, the results of the search are stored in another general purpose register 43.

Upon completion of the second search, the read only control store 38 causes the remainder of the record to continue to be supplied from the data storage device to error detection and correction circuitry 91. This comprises step 104. The error detection and correction circuitry continues to operate on the received data as described in the referenced patent applications. Upon reaching the end of the record, the "checkburst,"or redundant error check data, is supplied, to error detection and correction circuitry 91. As described in the referenced patent applications, this checkburst is EXCLUSIVE-ORed with the checkburst developed by error detection and correction circuitry 91 to produce an error syndrome. The syndrome contains nothing but zeroes if the received data is the same as the originally transmitted data which was supplied to and stored by the data storage device 11. If the syndrome does not contain all zeroes, circuitry 91 has detected the presence of at least one error. This indication is supplied on lines 96 and lines 50 to the read-only control store. In FIG. 2, the indication of an error is shown by result 105 of the error detection step 104 and the indication of a syndrome containing all zeroes is represented by result 106 from error detection step 104.

In a "no error" case, the result of the first search is correct and, in step 107, the storage control operates to transmit the result of the first search as stored in the first general purpose register 43 to the central processing unit.

If, however, an error was indicated by result 105, the flow chart proceeds to step 108. In step 108, the error detection and correction circuitry 91 decodes the error syndrome, as described in the referenced patent applications, to provide the location "*p*" of the byte containing the first bit in error. The number "*p*" is then supplied to a predetermined addressed position in buffer 12. The location "*q*" of the byte which may contain the last correctable bit in error is determined by reading the location "*p*" from the buffer 12 and transmitting it, via A bus 35, the ALU 36. At the same time, read only control store 38 supplies a predetermined constant, via B bus 37, to the ALU. The length of the longest error burst which is correctable by the circuitry 91 is known and that number is the predetermined constant. The ALU adds the constant to the location p and the resultant location, "*q*," is supplied to another predetermined addressed position in buffer 12.

Figure 3:
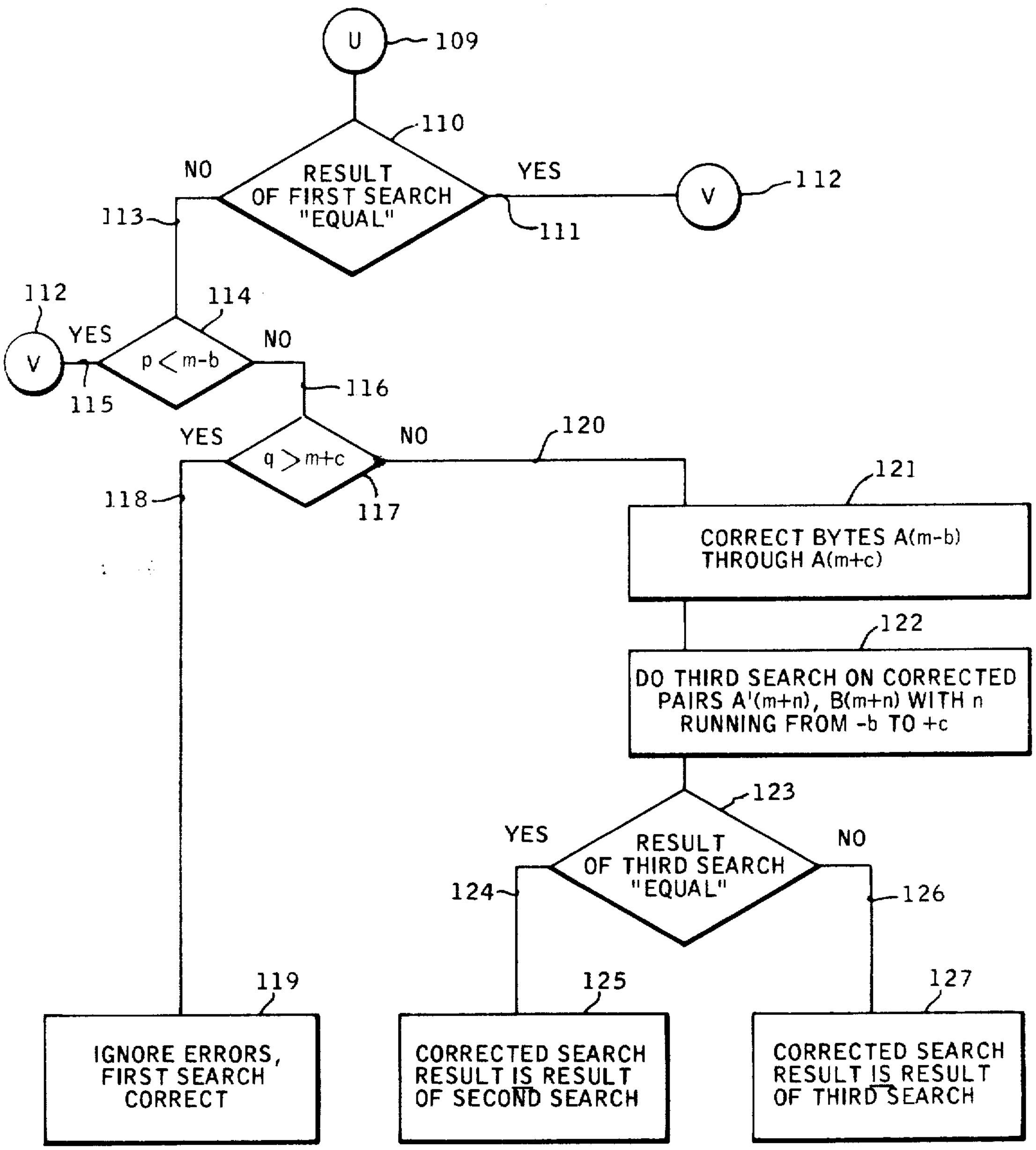

The flow chart then proceeds to connector 109 and to FIG. 3. In FIG. 3, connector 109 is shown which indicates as the flow chart path proceeding from step 108 to step 110. In step 110, the result of the first search is compared in ALU 36 with a predetermined character from buffer 12 to detect whether that result indicated the two keys were "equal" and no unequal bytes were found. Such an equality comprises result 111 and the flow chart proceeds to connector 112. A description of that path will be made subsequently. If the result of the first search was "unequal," the resultant path 113 is followed. In the next step 114, the location "*m*" of the first unequal byte is transmitted from the general purpose register 43 to ALU 36, where a constant, for example, of 2 is subtracted therefrom. The constant of 2 is employed where five bytes of data have been stored. This indicates the position of the first byte of data stored in buffer 12, the position being "$m-b$." This position information is supplied to another general purpose register 43 and retransmitted over cable 45 to B bus 37. The position "*p*" of the byte which may contain the first bit in error is supplied on A bus 35 from the buffer 12 to ALU 36. The ALU compares the two positions in step 114 to detect whether the position "*p*" is less than the position $(m-b)$. If *p* is smaller, this indicates that at least part of the error occurred prior to the data which has been stored as the result of the detection of the first unequal byte. This comprises result 115 which refers to flow chart connector 112. Again, the steps comprising continuation of this path will be discussed hereinafter.

If the comparison provides result 116, this indicates that the location "*p*" is equal to or larger than $(m-b)$, meaning that location "*p*" does not occur prior to $m-b$. This result leads to step 117. At this time, the location "*m*" of the first unequal bit is again transmitted from its general purpose register 43 to ALU 36, where another constant, "*c*," is now added thereto rather than subtracted therefrom. In the present example, constant "*c*" is identical in absolute value to constant "D." This indicates the position of the last byte of data stored in buffer 12, the position being "$m+c$." This position information is supplied to the other general purpose register 43 and retransmitted over cable 45 to B bus 37. The position "*q*" of the first bit in error is supplied on A bus 35 from the buffer 12 to ALU 36. The ALU compares the two positions in step 117 to detect whether position "*q*" is greater than the position $(m+c)$. If "*q*" is greater, this indicates that at least a part of the error occurred after the data which has been stored as the result of the detection of the first unequal bit. This comprises result 118 which refers to step 119. That result as indicated by the output of ALU 36 causes selection of the read-only control store which operates the storage control to transmit the stored result of the first search from its general purpose register 43, via B bus 37, ALU 36, D bus 40 to CPU data and control interface 33 for transmission to the central processing system.

If, however, the ALU 36 indicated that "*q*" was less than or equal to $(m+c)$, result 120 is indicated. This result indicates that the error or error burst has occurred entirely within the string of five bytes of data from the device which has been stored in buffer 12. Due to that indication by the ALU 36, step 121 is initiated which comprises supplying the five bytes of data from buffer 12 to A bus 35, via ALU 36, D bus 40, cable 42, general purpose register 43, cable 45, B bus 37 and cable 97 to error detection and correction circuitry 91. The error detection and correction circuitry operates, as described in the referenced patent applications, to EXCLUSIVE-OR the supplied five bytes of data with the decoded error correction syndrome therein. As each byte of data is corrected, it is supplied via output cable 95, cable 62, B bus 37, ALU 36, D bus 40 and cable 63 to its prior location in buffer 12.

Upon completion of the correction step 121, the storage control proceeds to transmit both the corrected five bytes of data "A' $(m+n)$" and the corresponding five bytes of the desired key data "B$(m+n)$" to the ALU 36 for comparison. In the designations of the data, "*n*" is considered as running from the byte located at $m-b$ to the byte located at $m+c$. The comparison is accomplished by first gating the first byte of corrected key data from the buffer, via A bus 35, ALU 36, D bus 40 and cable 42 to its general purpose register 43. The complete desired key was originally stored in buffer 12. Therefore, the corresponding byte of the desired key data then is gated from buffer 12, via A bus 35 to ALU 36, while the corrected device key data is transmitted from the general purpose register 43 via cable 46 and B bus 37 to the other input of ALU 36. The ALU then compares the two bytes of data. The comparison is continued on a byte-by-byte basis through the five bytes of key data. This search operation is called the "third" search. The result of the search is provided by ALU 36 on lines 50 and comprises step 123 of FIG. 3. If the comparison indicates that the two sets of five bytes are equal, this comprises result 124, and, in step 125, the read-only store transmits the results of the second search, obtained from step 103, to CPU data and control interface 33 for transmission to the CPU. This means that the inequality detected in the first search was caused by the erroneous data, and that upon correction of the data, the key data from the device and the desired key were equal at that point. Thus, the true search result was that obtained in the second search, which search was dependent upon data appearing subsequent to that data which contained the error.

If, however, the result of the third search was not equal, this comprises path 126 leading to step 127. This result indicates that the comparison of the stored five bytes remained unequal after correction and, therefore, that the result of this "third" search comprises the true search result. Therefore, read-only control store transmits the result of the search as indicated by the ALU to B bus 37 and, via ALU 36, D bus 40 and cable 41, to CPU data and control interface 33, and then to the CPU.

Figure 4:
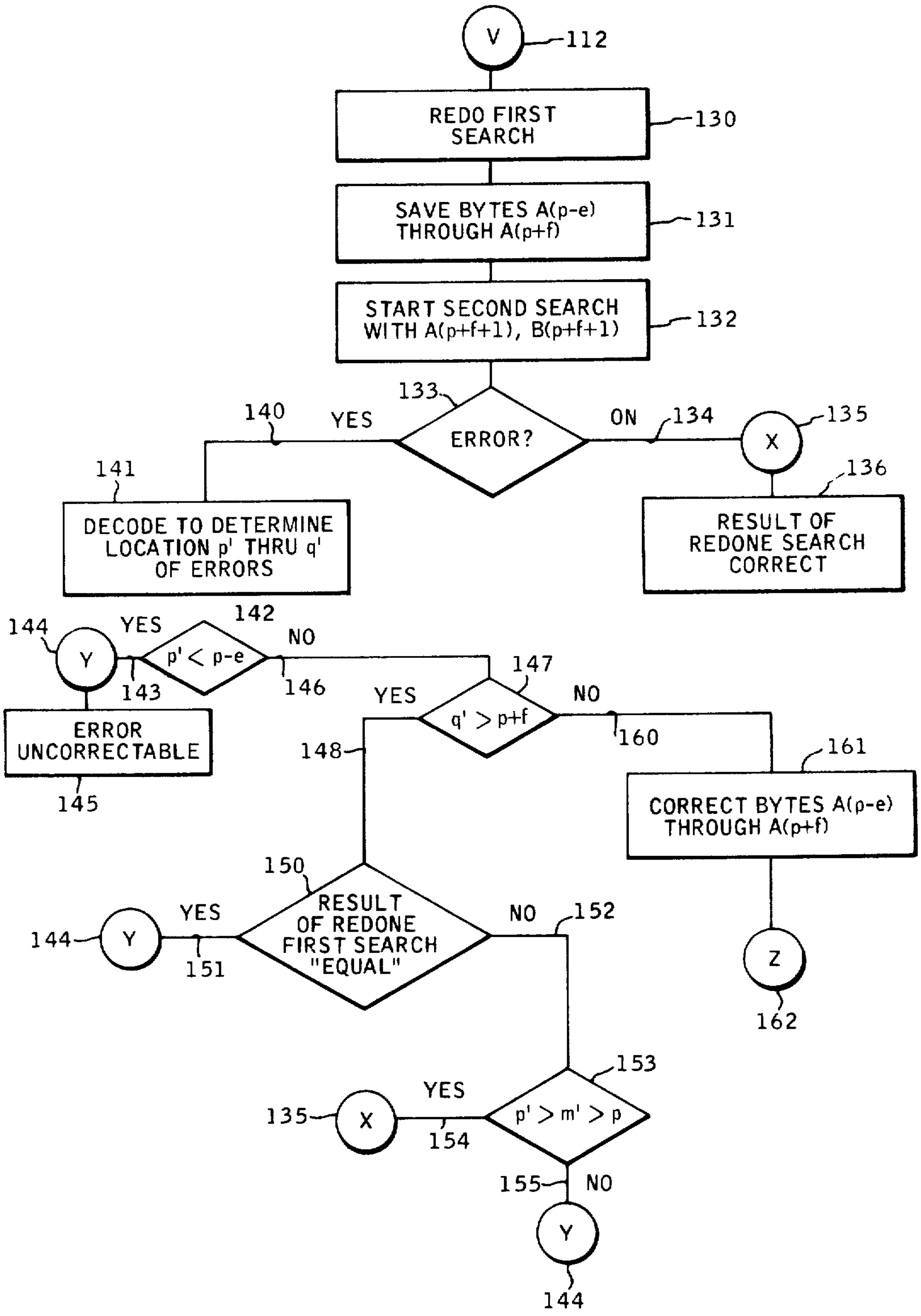

Both connectors 112 in FIG. 3 lead to the flow chart connector 112 in FIG. 4. As described above, this position on the flow chart results from the situation 111 where the key data from the device and the desired key were equal, but the key data from the device contained an error. The other path to reach this point comprised the situation 115 where the error occurred prior to the detection of the first unequal byte.

Flow chart connector 112 leads to step 130. Step 130 comprises redoing the first search in the same manner as step 100 in FIG. 2, including saving the continuous string of five bytes of data as the search progresses. With respect to the first search 100, the bytes surrounding the detected first unequal byte were saved. The difference in this case is that step 131 directs that the bytes of data from the device immediately surrounding the burst of erroneous data be saved, rather than the data immediately surrounding the first unequal byte. This is accomplished by setting the decoded error location into a general purpose register 43, and transmitting the contents of the register to ALU 36 where it is decremented by one and returned to the general purpose register each time a byte of data is compared to the desired key in the ALU. These are accomplished on alternate cycles of the ALU. As shown in step 131, "*p*" comprises the location of the byte of data containing the first bit in error. Also shown herein are "*e*" and "*f*," each comprising a predetermined constant. "A(*p*—*e*)" represents the first byte of data saved in the buffer 12, while "A(*p*+*f*)" represents the last byte of data stored therein. Thus, *e*+*f*+*l* equals the total number of bytes of data stored in the buffer. In the present example, the total number of such bytes is five. Also in the present example, "*e*" is equal to 1 and, therefore, "*f*" is equal to 3.

As shown in step 132, after saving the five bytes of data from the device surrounding and including the error burst, a second search is conducted, but none of the data is saved. In either the first search 130 or the second search 132, the first time that an unequal byte is detected by ALU 36, the result of that inequality is stored in a general purpose register 43. If neither the first nor second search indicates an unequal byte, the second search continues through the end of the key and the result of the search is therefore that the keys were equal. In step 133, the remainder of the record from the device is supplied to error detection and correction circuitry 91, as with step 104 of FIG. 2, in order to accomplish error detection. If, at this time, the error detection and correction circuitry 91 supplies an indication on cable 96 that no error was detected, this comprises result 134. Such a result is possible if the first error detected in step 104 of FIG. 2 comprised a "soft" error which may or may not be repeated upon subsequent readings of the data. If, as the result, no error was detected in step 133, the result 134 leads to connector 135, which is connected to step 136. In this step the result of the searches 130 and 132, which is stored in a general purpose register 43, is gated by the read-only control store, via cable 46, B bus 37, ALU 36, D bus 40 and cable 41 to CPU data and control interface 33, for transmission to the CPU.

If, however, the error detection and correction circuitry 91 supplies on output 96 an indication that there was an error, this comprises result 140. In step 141, the error detection and correction circuitry decodes the error syndromes, as with respect to step 108, to determine the location of the error burst.

In step 142, the location "*p*" of the first byte in error, which was obtained in step 108, is supplied from buffer 12 to ALU 36, where the predetermined number "*e*" is subtracted therefrom, and the result stored in the general purpose register 43. At that time, the resultant location number (*p*—*e*) is supplied on cable 44 to A bus 35 for comparison to the decoded location "*p*" of the first bit in error from step 133. If the location "*p*′" is less than the location (*p*—*e*), this indicates that the error occurred before the first byte of data A(*p*—*e*) which was stored in buffer 12. This comprises result 143 and directs the flow chart path to connector 144 and to step 145, indicating that the error is uncorrectable by this procedure. In step 145, a read-only control storage unit is selected which contains a special character which is transmitted on B bus 37, via ALU 36, D bus 40 and cable 41 to CPU data and control interface 33, for transmission to the CPU. This special character indicates that an uncorrectable error prevented completion of the request by the CPU.

If, however, the location *p*′ was equal to or greater than the location (*p*—*e*), this comprises result 146 which proceeds to step 147. In step 147, the stored location "p" of the first bit in error from step 108 of FIG. 2, is again supplied to the ALU 36. This time, the predetermined constant "*f*" is added thereto and the result "(*p*+*f*)" supplied to a general purpose register 43. At this time, the resultant location (*p*+*f*) is supplied on A bus 35 to the ALU 36 for comparison to the location "*q*′" of the last bit in error from step 141. If the comparison indicates that "*q*′" is greater than "(*p*+*f*)", this comprises result 148 and indicates that a portion of the burst of erroneous data lies outside the stored data from step 131. This leads to step 150 in which the stored result of search 130 and 132 is compared in ALU 36 to detect whether that result was "equal" or "unequal." If the result of the search indicated that the key data read from the device was equal to the desired key, this comprises result 151 which is directed to connector 144. Connector 144 connects to step 145, discussed above, and supplies a special character to the CPU data and control interface 33 which indicates that the error is uncorrectable by this procedure.

If, however, the result of the read on first and second searches indicated that the keys were "unequal," this comprises result 152 and leads to step 153.

In step 153, the stored location "*m*′" of the first unequal byte detected in the redone searches is compared in the ALU 36 to the location "*p*′" of the first byte containing an error resulting from the second error detection as decoded in step 141. In addition, the location *m*′ is compared to the location "*p*" of the first byte containing an error from the first search of step 100, as decoded in step 108 in FIG. 2. If the location *m*′ is less than the location *p*′ and greater than the location p, this indicates that the first unequal byte is located in the error burst detected during the first search, but that it occurred prior to the first byte containing an error in the redone searches. Therefore, this indicates that the result of the redone searches is correct and comprises result 154 which is directed to connector 135 and step 136, discussed above. That step transmits the result of the redone searches to the CPU data and control interface 33 for transmission to the CPU.

If, however, the location *m*′ of the first unequal byte of the redone searches is not so located, this comprises result 155 which leads to flow-chart connector 144 and to step 145, indicating that the error is uncorrectable by this procedure.

Referring again to step 147, if the location "*q*′" of the last byte of the redone searches containing an error is equal to or less than the location "(*p*+*f*)," this indicates that the error burst is contained entirely within the bytes of data A(*p*—*e*) through A(*p*+*f*) saved in buffer 12. This comprises result 160 and leads to step 161. Step 161 is essentially the same as step 121 of FIG. 3. The five bytes of data A(*p*—*e*) through A(*p*+*f*), which were saved in buffer 12, are transmitted to error detection and correction circuitry 91 where they are exclusive ORed with the correction syndrome so as to supply the corrected five bytes of data and return them to storage in buffer 12.

Figure 5:
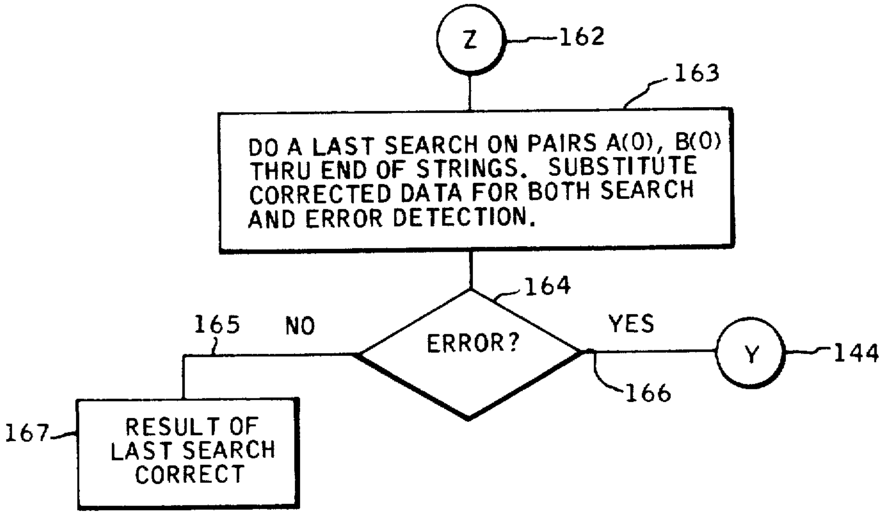

The flow chart then proceeds to connector 162, which continues the flow chart in FIG. 5, leading to step 163. Step 163 comprises another search operation, called the "last" search operation. It is conducted similarly to the redone first and second searches, except that no data is supplied to the buffer 12. Similarly to the searches 130 and 132, the number representing location p′ of the first byte containing an error is first supplied to ALU 36 from the buffer 12, decremented by one, and supplied to a general purpose register 43. The search is then conducted, comparing the key data from the device 11 to the desired key data from buffer 12 in ALU 36. As each byte is compared by the ALU 36, the number stored in the general purpose register 43 is then supplied to the ALU 36, where it is decremented by one, and returned to the general purpose register. When the ALU 36 decrements the number from general purpose register 43 to zero, the ALU supplies signals on lines 50 to select another read-only control storage unit. This causes the first byte of the corrected data "A(p′)" to be supplied to another general purpose register 43. This byte is then transmitted, via cable and B bus 37, to the cable input 98 to error detection and correction circuitry 91. This input is the same as that from cable 94, but the read-only control store 38 operates the control decode circuitry to block the input from cable 94 and to gate the input from cable 98. The byte of data is then supplied on B bus 37 to ALU 36, where it is compared to the corresponding byte of the desired key data from buffer 12 appearing on A bus 35. The five bytes of corrected data are thus supplied to error detection and correction circuitry 91 and thence to ALU 36, via cable 62, to substitute for the incorrect data from the data storage device.

Upon completion of substituting the five bytes of data, the search continues, employing the data from the data storage device 11, as before. Upon detection of the first unequal byte, the result of the search is supplied to the general purpose register 43, as above, and the remainder of the data record is supplied to error detection and correction circuitry 91 to detect whether there are any errors in the record after correction. This comprises step 164. In that step, the error detection syndrome is checked, as before, to detect whether the resultant error syndrome contained all zeroes as shown in result 165 which indicates that there were no errors, or whether the error syndrome was not all zeroes comprising result 166 which indicates that there was an error. If there are no errors, result 165 causes the read-only control store to select step 167 in which the result of this last search as stored in the general purpose register 43 is transmitted to the CPU data and control interface 33 for subsequent transmission to the CPU. However, if there was an error, result 166 directs the read-only control store to connector 144 which refers to step 145 in FIG. 4 wherein a special character is transmitted to the CPU data and control interface 33 to indicate that the error is uncorrectable by this procedure.

While the invention has been particularly shown and described with reference to preferred embodiments thereof, it will be understood by those skilled in the art that various changes in form and details may be made therein without departing from the spirit and scope of the invention.

What is claimed is:

1. In a method for retrieving desired records of data, said records each including key data in a predetermined part thereof and said records each including first error check data iteratively developed from said record without said check data, by searching a plurality of sequentially and cyclically appearing records from data storage means by reading said predetermined part of said records for comparison thereof to a search argument supplied by a search request, the improvement thereto comprising:

conducting a search of each said record by sequential comparison of said predetermined part of said record with said supplied search argument until a point of non-comparison is detected thereby, storing, in response to said search, a signal indication of the result of said search;

iteratively developing second error check data from said record;

decoding said first and second error check data to provide an error signal indication of the occurrence and location of any error in said record and providing an error signal upon any said error location being prior to and inclusive of said point of non-comparison;

selecting, in response to the absence of said error signal, said stored result of said search as being correct; and providing a signal in response to the presence of said error signal, indicating said search is in error.

2. The method of claim 1, including:

the additional step of providing point location signals in response to said detection of said non-comparison, said point location signals indicating the location in said record of said point of non-comparison; and wherein said "decoding" step comprises the steps of:

decoding said first and second error check data to provide an error signal indicating the occurrence of any error in said record;

further decoding said error check data, in response to said error signal, to provide error location signals indicating the location in said record of said errors; and comparing, in response to said error signal, said point location signals with said error location signals to provide a first error position signal upon said error location signals indicating a location in said record following that indicated by said point location signals;

wherein said "selecting" step comprises selecting, independently in response to the absence of said error signal upon completion of said error detection, or to the absence of said first error position signal upon the completion of said "comparing" step, said stored result of said search as being corrected; and wherein said "providing" step comprises providing a signal, in response to the presence of said first error position signal upon completion of said "comparing" step indicating said search is in error.

3. The method of claim 2, including the additional steps of:

storing, in response to said detection of said non-comparison, a portion of said record data including said point of non-comparison;

conducting a second search of said record by comparison of the remainder of said predetermined part thereof immediately following said stored portion of said record, with the corresponding remainder of said supplied search argument; and storing, in response to said second search, a second signal indication of the result of said second search; and wherein said "comparing" step comprises comparing, in response to said error signal, said point location signals with said error location signals to provide one of the following a first error position signal upon said error location signals indicating a location in said record following that indicated by said point location signals; a second error position signal upon said error location signals indicating the same location in said record as that indicated by said point location signals; or a third error position signal upon said error location signals indicating a location in said record preceding that indicated by said point location signals; and said "selecting" step comprises selecting said stored result of said first search as being correct, independently in response to the absence of said error signal upon the completion of said error detection, or to the presence of said third error position signal upon the completion of said "comparing" step; and said method of claim 2 also including the additional steps of:

correcting in response to said second error position signal, said detected errors in said stored portion of said record by further decoding said error check data therewith;

conducting a third search by comparison of said corrected portion of said record with the corresponding portion of said supplied search argument, and providing a third signal indication of the result of said third search;

selecting, in response to said third signal indication indicating that said compared portions are the same, said stored result of said second search as being correct; and selecting, in response to said third signal indication indicating that said compared portions are not the same, said third signal indication of the result of said third search as being correct.

4. The method of claim 3, wherein:

said "comparing" step comprises comparing, in response to said error signal, said point location signals, modified by predetermined constants to indicate the beginning and end locations in said record of said stored portion of said record data, with said error location signals to provide one of the following: a first error position signal upon said error location signals indicating a location in said record following that of the end of said stored portion indicated by said modified point location signals; a second error position signal upon said error location signals indicating said error locations in said record are between those of the beginning and end of said stored portion indicated by said modified point location signals; or a third error position signal upon said error location signals indicating a location in said record preceding that of the beginning of said stored portion indicated by said modified point location signals.

5. The method of claim 4, including the additional steps of:

conducting, in response to the presence of said first error position signal upon completion of said "comparing" step, another first and second search of said record by sequential comparison of said predetermined part thereof with said supplied search argument;

storing, in response to said another search, a signal indication of the result of said another search;

during said another first and second search, storing, in response to said another search and said error location signals, another portion of said record data at the location in said record indicated by said error location signals;

iteratively developing third error check data from said record;

decoding said first and third error check data to provide a second error signal indicating the occurrence of any error in said record prior to and inclusive of said location indicated by said error location signals;

selecting, in response to the absence of said second error signal, said stored result of said another search as being correct;

correcting, in response to said second error signal, said stored another portion of said record data by further decoding said first and third error check data therewith;

conducting, in response to said correction of said stored another portion of said record, a last search of said record by comparison of said predetermined part thereof with said supplied search argument, substituting said corrected another portion of said record for said another portion as read from said record;

storing, in response to said last search, a signal indication of the result of said last search;

iteratively developing fourth error check data from said record including said substituted data;

decoding said first and fourth error check data to provide a third error signal indicating the occurrence of any error in said record; and selecting, in response to the absence of said third error signal upon completion of said last "decoding" step, said stored result of said last search as being correct; and wherein:

said "providing" step comprises providing a signal, in response to said third error signal, indicating said search is in error and uncorrectable by this procedure.

6. The method of claim 5, wherein said "selecting" steps and said "providing" steps each include supplying said selected and provided signals to an output means.

7. The method of claim 6 for retrieving said desired records of data from data storage devices having relatively slow data access speeds, wherein:

said "storing" steps each comprise storing said signals in a storage means having relatively high data access speeds.

8. In apparatus for retrieving desired data records, said data records each including key data in a predetermined part thereof and each including first error check data iteratively developed from said record without said check data, from a selected data storage device, said device repetitively supplying a string of said data records for reading, said apparatus including device control means for controlling the reading of said supplied data by said device, read data means for receiving said data as read, interface means for receiving externally supplied search request signals and associated search argument signals and to which signals are supplied for communication with external apparatus, buffer memory means for storing data signals, logic means for selectively operating on supplied data signals, and control and transmission means for controlling the operation of all said means and for controlling the transfer of data signals between said means; said control and transmission means being arranged to respond to said search request signals when received by said interface means to store said associated search argument signals in said buffer memory means, to cause said device control means to cause the reading by said device of said records to supply the data read from each said record to be received by said read data means, and to cause said key data of said record and said search argument from said buffer memory means to be transmitted to said logic means for comparison therebetween sequentially therealong; the combination therewith comprising:

error detection generator means controlled by said control means for iteratively developing error check data from any data records supplied thereto;

error detection decoding means for decoding said developed error check data and said error check data included with said record to detect thereby errors in said record and the location in said record of said errors; and the arrangement of said control and transmission means to additionally comprise means for operating said logic means to indicate the location in said record that said comparison thereby detects a point of non-comparison; means for responding to said detection to store point location signals from said logic means indicating said location and to store search result signals indicating the result of said comparison in said buffer memory means; means for transmitting said record to said error detection means and operating said error detection means to provide an error signal upon detecting an error in said record and to thereupon supply error location signals indicating said location in said record of said errors; means for responding to said error signal by transmitting said stored point location signals and said error location signals to said logic means for comparison therebetween to thereby provide a first error position signal upon said error location signals indicating a location in said record following that indicated by said point signals; means for responding independently to the absence of said error signal upon completion of the operation of said error detection means, or to the absence of said first error position signal upon completion of said operation of said logic means, to transmit said stored search result signals from said buffer memory means to said interface means; and means for responding to said first error position signal by supplying a predetermined set of signals, said signals indicating said search is in error.

9. The apparatus of claim 8 wherein:

said error detection means also comprises error correction means for decoding said error check data together with supplied data of said record containing said errors to correct said errors; and said control and transmission means is additionally arranged to comprise means for responding to said detection of a point of non-comparison by said logic means to store a portion of said record immediately spanning said point of non-comparison in said buffer memory means means for responding to said storage to continue to supply said key data of said record and said search argument to said logic means for second comparison; means for responding to said continued comparison to supply second search result signals representing the result thereof from said logic means to said buffer memory means; means for operating said logic means in response to said error signal to additionally provide a second error position signal upon said error location signals indicating the same location as that indicated by said point location signals, or a third error position signal upon said error location signals indicating a location preceding that indicated by said point location signals; said means for independently responding to the absence of said first error position signal being for responding independently to said third error position signal; means for transmitting said stored portion of said record to said error detection and correction means for correction thereof; means for responding to said correction to transmit said corrected portion of said record and the corresponding portion of said stored supplied search argument signals to said logic means for third comparison therebetween means for responding to said third comparison indicating said compared portions are the same to transmit said stored second search result to said interface means; and means for responding to said third comparison indicating said compared portions are not the same to transmit signals indicating the result of said third comparison from said logic means to said interface means.

10. The apparatus of claim 9 wherein:

said data storage device comprises one of a plurality of devices having relatively slow data access speeds; and said buffer memory means comprising a data storage means having relatively high data access speeds.

11. The apparatus of claim 9 additionally including:

error encoder means for initially iteratively developing said first error check data for each said record; and write data means for holding supplied data for transmission to said device, and wherein:

said device control means additionally includes means for controlling the writing of data in said device; and said control and transmission means is additionally arranged to comprise means for responding to externally supplied write request and data at said interface means to supply said data to said error encoder and said encoded data to said write data means; and means for operating said device control means to control said device to write said supplied data from said write data means in said device.

* * * * *